June 18, 1974 E. C. BETZ 3,817,716
CATALYTIC INCINERATION APPARATUS
Filed Nov. 18, 1971
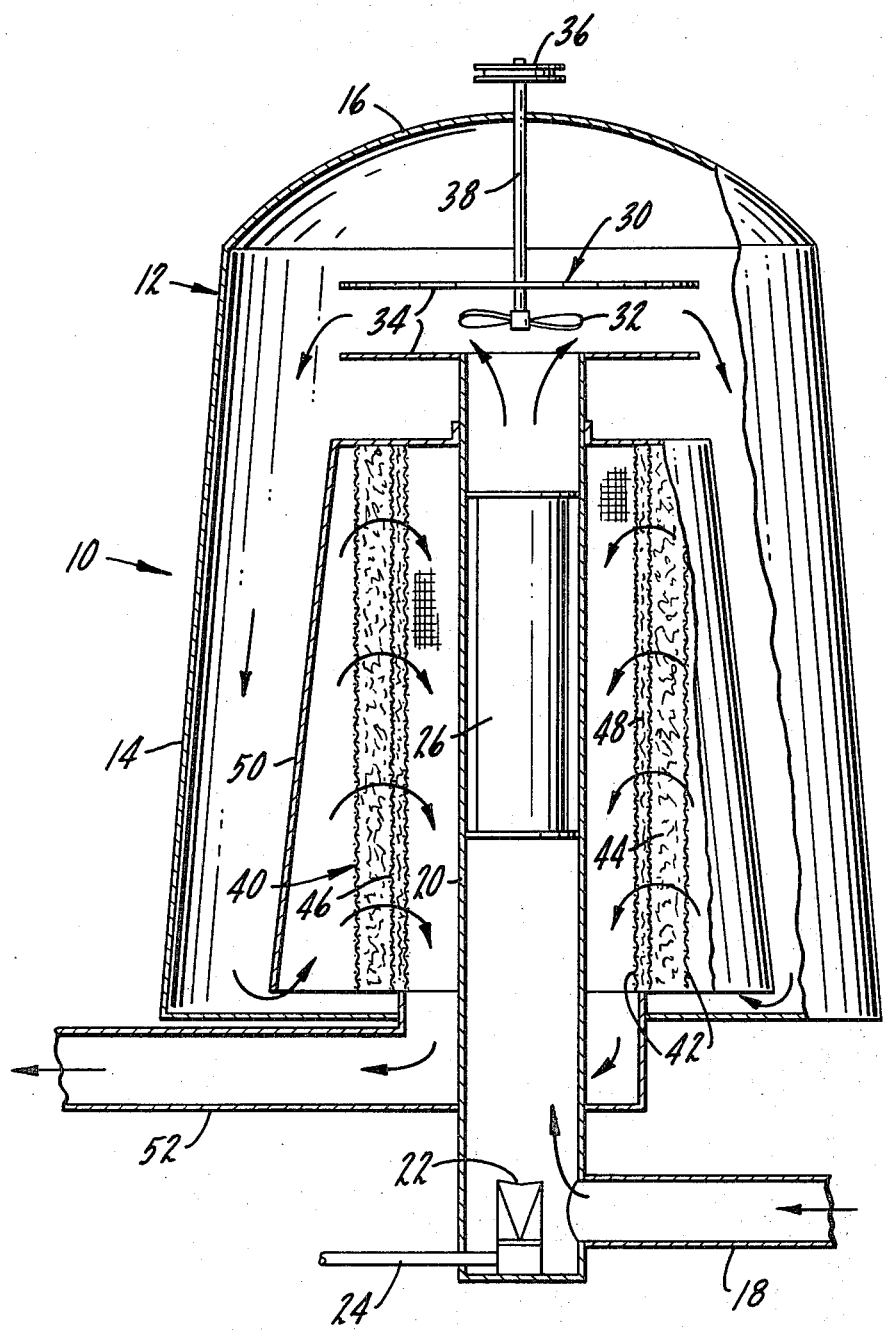

United States Patent Office 3,817,716
Patented June 18, 1974

3,817,716
CATALYTIC INCINERATION APPARATUS
Erwin C. Betz, 54 Mill Valley Road,
Palatine, Ill. 60067
Filed Nov. 18, 1971, Ser. No. 200,042
Int. Cl. B01j 9/04
U.S. Cl. 23—288 F                    10 Claims

ABSTRACT OF THE DISCLOSURE

The invention provides an apparatus for the catalytic incineration of waste gases containing hydrocarbons. In its broad aspects, the invention comprises cracking hydrocarbons in the presence of a cracking catalyst and subsequently oxidizing the hydrocarbons in the presence of an oxidation catalyst. The apparatus comprises means defining a cracking chamber containing a cracking catalyst together with means for delivering gases to the cracking chamber and means defining an oxidation chamber. The oxidation chamber contains an oxidation catalyst, and means are provided for delivering waste gases from the cracking chamber to the oxidation chamber.

---

The present invention relates to an improved apparatus for the catalytic incineration of waste gases containing hydrocarbons.

As used herein, it will be understood that the term "waste gases" refers not only to wastes that are strictly gaseous, but also to organic wastes containing aerosols, which are tiny droplets of waste material, usually formed by partial condensation, and generally surrounded by a layer of gas. Such aerosols present a particular problem in the oxidation of organic waste gases, since they must be gasified before they can be effectively treated by oxidation catalysts. However, these aerosols are resistant to gasification because the liquid droplets are effectively insulated by the surrounding layer of gas.

Another problem in the oxidation of the hydrocarbon-containing waste gases is that such gases often contain organic materials of relatively high molecular weight (i.e., molecular weights greater than about 50). Such materials are acted upon slowly by oxidation catalysts, since they must be broken down before they can be oxidized to carbon dioxide and water.

Generally, the present invention relates to apparatus for catalytically incinerating waste gases containing hydrocarbons by cracking the hydrocarbons in the presence of a cracking catalyst, and subsequently oxidizing the hydrocarbons in the presence of an oxidation catalyst. Such pre-cracking of the hydrocarbons reduces the molecular weight of the higher molecular weight portions, and thus permits more complete oxidation by the oxidation catalyst.

In its general aspects, the present invention also provides a catalytic incinerator which comprises means defining a cracking chamber containing a cracking catalyst, together with means defining an oxidation chamber containing an oxidation catalyst. Means are provided for delivering gases to the cracking chamber, and means are also provided for delivering gases from the cracking chamber to the oxidation chamber. Outlet means are also provided for delivering gases out of the incinerator after the gases have passed through the catalysts.

The invention, its construction and method of operation, together with the objects and advantages thereof, will be best understood by reference to the following detailed description, taken in conjunction with the drawing, which is a cutaway plan view of an apparatus embodying the features of the present invention.

In carrying out the present invention, waste gases, such as those that might be produced by a wire enameling oven, for example, which gases contain hydrocarbons, are delivered to a cracking zone, where they are cracked in the presence of a cracking catalyst. Depending upon the application, it is sometimes desirable to preheat these gases before contacting them with the cracking catalyst. In some applications, the waste gases are already warm enough, and such preheating is not required. Whether or not preheating is employed, it is desirable that the waste gases be at a temperature of at least about 85° C. before coming into contact with the cracking catalyst.

Any conventional cracking catalyst may be employed in connection with the method of the present invention. Examples of suitable catalysts are disclosed in U.S. Pats. 3,266,477; 3,460,523; and 3,492,148. It should be understood that, as used herein, the term "cracking" refers to a reduction in the molecular weight of the organic compounds in the waste gas stream. However, as a result of the presence of oxygen in the gas stream, some oxidation of the gases may also occur during the cracking step. Although the foregoing patents deal primarily with catalysts characterized as "oxidation" catalysts, these catalysts are also capable of performing the desired cracking function at the temperatures indicated herein.

Subsequent to cracking, the stream of waste gases is oxidized in the presence of an oxidation catalyst. A wide variety of catalysts for the catalytic oxidation of hydrocarbon streams is well known in the art, and catalysts having either a metallic base or a ceramic base may be employed in accordance with the present invention, although those having a metallic base are preferred. A suitable metallic-base catalyst is disclosed in U.S. Pat. No. 2,720,494. A particularly suitable catalyst is described in my co-pending application, Ser. No. 94,627, filed Dec. 2, 1970 now U.S. Pat. No. 3,712,856, issued Jan. 23, 1973. Optimally, such catalytic oxidation occurs within a temperature range of about 380–420° C., although temperature is not ordinarily critical.

If it is desired in accordance with the present invention, the waste gases may also be contacted with a reduction catalyst, either before or after contact with the oxidation catalyst. Such reduction is also preferably carried out subsequent to cracking and subsequent to the removal of any catalyst poisons that may be present in the waste gas stream. Reduction is desirable when the waste gases contain oxides of nitrogen which are reduced to harmless nitrogen and oxygen. Suitable reduction catalysts are extremely well known in the art. A particularly suitable and well known reduction catalyst comprises a combination of cobalt and molybdenum deposited on an amorphous or crystalline alumino-silicate base material. The deposited metals ordinarily make up about 0.5 to 1.5 weight percent of the catalyst, and the ratio of metals is ideally about 25–35 weight percent cobalt and about 65–75 weight percent molybdenum.

Referring to the drawing, a catalytic incinerator embodying the features of the present invention is generally indicated by reference numeral 10. In the most preferred embodiment shown, the incinerator 10 has an outer housing 12, of sheet metal or the like, the outer housing 12 having a side wall 14 of circular cross-section and tapering outwardly so that the housing 12 is wider at the bottom of the apparatus than it is near the top. In the embodiment shown, the housing 12 also has a domed roof section 16.

Waste gases for catalytic incineration are delivered to the incinerator 10 through a waste gas inlet pipe 18, which communicates with the lower portion of a central, vertical, generally cylindrical flue 20. Heating means, in this instance a gas burner 22 having a fuel supply line 24, is positioned in a lower portion of the central flue 20. As previously mentioned, the burner 22 is only required in instances where the temperature of the incoming gases in the waste gases inlet pipe 18 are below that desired for contact with the cracking catalyst as hereinafter described.

The interior of the central flue 20 forms a cracking zone, and a cracking catalyst element 26 is positioned the flue 20 above the gas burner 22. In the embodiment shown, the element 26 comprises a spool-shaped receptacle for easy removal, although such design is by no means critical. The cracking catalyst element 26 preferably contains a plurality of metallic screens having catalytically treated surfaces, although ceramic-base cracking catalysts may also be employed, as previously described.

A centrifugal fan unit 30 having a blower 32 and a shroud assembly 34 communicates with an upper portion of the central flue 20, to draw gases through the flue 20 and distribute them in a radially outward direction, as indicated by the arrows. The blower 32 is driven by a suitable drive means (not shown) connected to a pulley 36 by a belt (not shown). The pulley 36 is, in turn, connected to the blower 32 by a shaft 38.

The central flue 20 is surrounded by a generally cylindrical catalyst element 40, which is spaced from the flue 20. By the term "generally cylindrical," it is simply meant that the catalyst element 40 preferably completely surrounds the central flue 20. However, the overall catalyst element 40 need not be cylindrical, but may, for example, be polygonal in shape, being made up of a number of flat catalyst elements. In any event, the generally cylindrical catalyst element 40 is preferably formed by outer and inner screens 42 between which is located the catalyst 44. In the embodiment shown, the catalyst 44 comprises catalytically coated metal ribbon, although ceramic catalyst may also be used. This catalyst 44 comprises an oxidation catalyst, and as previously mentioned, numerous suitable oxidation catalysts are well known in the art.

In the embodiment shown, the generally cylindrical catalyst element 40 includes an intermediate screen 46, so that a reducing catalyst 48 may also be incorporated into the catalyst element 40. Thus, as gases pass through the catalyst element 40, as shown by the arrows, the gases pass first through an oxidizing catalyst 44 and then through a reducing catalyst 48, the two catalysts 44, 48 being separated by an intermediate screen 46.

The generally cylindrical catalyst element 40 is preferably surrounded by a skirt 50, spaced from the catalyst element 40. It is preferred that the skirt 50 be of generally circular cross-section. In the preferred embodiment shown, the skirt is of frusto-conical configuration, that is, it is wider at the bottom than at the top. The skirt 50 is preferably coated with a cracking catalyst on its outer surface. A particular advantage of this outwardly flared construction is that any aerosols that have not previously been destroyed will tend to be "rolled along" the progressively widening outer surface of the skirt 50. This rolling action tends to break down the gas layer which insulates the aerosol droplets, rendering them susceptible to vaporization and cracking.

The generally cylindrical element 40 is spaced from the central flue 20. Thus, as may be seen from the drawing, the outer surface of the central flue 20 and the inner surface of the outer housing 12 generally form an oxidation chamber which contains the oxidation catalyst 44. In this instance, the oxidation chamber also contains a reduction catalyst 48. Gases are delivered from the oxidation chamber to an outlet pipe 52, which communicates with the space defined by the outside of the central flue 20 and the inner screen 42 of the catalyst element 40.

In operation, gases are delivered to the catalytic incinerator 10 through the waste gas inlet pipe 18, and follow the path indicated by the arrows. Thus, these gases are heated by the burner 22, if necessary, and then pass upwardly through the cracking element 26, where their molecular weight is reduced. The gases then are distributed by the centrifugal fan unit 30 from the cracking zone to the oxidation zone.

In the oxidation zone, the gases pass downwardly along the skirt 50, which is preferably coated on its outside surface with a cracking catalyst. Any aerosols that have not been destroyed by this time will tend to be rolled along the skirt 50, where they are vaporized and cracked. The gases then pass through the generally cylindrical catalyst element 40, where the organic components are oxidized to carbon dioxide and water. Any oxides of nitrogen contained in the gases are reduced by the reducing catalyst 48. The gases then pass out of the unit through the outlet pipe 52.

It will be understood that many of the precise details of the construction shown in the drawings are not critical and, in fact, form no part of applicant's invention. For example, the precise location of the centrifugal fan unit 30 is unimportant, and other types of fan units positioned at other locations may be employed. Similarly, as previously mentioned, various portions of the apparatus may be dispensed with according to requirements. Thus, it might be unnecessary to provide a burner 22 or a reducing catalyst 48.

Obviously, many modifications and variations of the invention as hereinbefore set forth will occur to those skilled in the art, and it is intended to cover in the appended claims all such modifications and variations as fall within the true spirit and scope of the invention.

I claim:

1. A catalytic incinerator comprising: means defining a generally cylindrical cracking chamber containing a cracking catalyst; means for delivering gases to said cracking chamber; means defining an oxidation chamber containing an oxidation catalyst, said oxidation catalyst surrounding said cracking chamber in spaced relationship therewith; and said oxidation catalyst being constructed and positioned to permit gases to flow radially inwardly into the space between said oxidation catalyst and said cracking chamber; means for delivering gases from said cracking chamber to said oxidation chamber; and outlet means for delivering said gases out of said incinerator after said gases pass through said oxidation catalyst.

2. A catalytic incinerator comprising: means defining a generally cylindrical cracking chamber containing a cracking catalyst; means for delivering gases to said cracking chamber; means defining an oxidation chamber containing an oxidation catalyst, said oxidation catalyst surrounding said cracking chamber in spaced relationship therewith; means for delivering gases from said cracking chamber to said oxidation chamber; a skirt surrounding said oxidation catalyst in spaced relationship therewith, said skirt being positioned so that said gases pass along the outer surface of said skirt before reaching said oxidation catalyst; and outlet means for delivering said gases out of said incinerator after said gases pass through said oxidation catalyst.

3. The apparatus as defined in claim 2 wherein the outer surface of said skirt is coated with a cracking catalyst.

4. A catalytic incinerator comprising: a housing having a side wall of generally circular cross-sectional configuration; a central, vertical flue within said housing, said flue having an opening at the top; inlet means for delivering gases to said flue; a cracking catalyst element positioned within said flue; a generally cylindrical oxidation catalyst element surrounding said flue in spaced relationship therewith; a skirt of generally circular cross-sectional configuration surrounding and being spaced from said oxidation catalyst element; and outlet means communicating with the space between said catalyst element and said flue.

5. The incinerator as defined in claim 4 further comprising a reduction catalyst surrounding said flue in spaced relationship therewith.

6. The incinerator as defined in claim 4 wherein said skirt is wider at the bottom than at the top, and wherein the outer surface of said skirt is coated with a cracking catalyst.

7. The incinerator as defined in claim 6 wherein said side wall of said housing is wider at the bottom than at the top.

8. The incinerator as defined in claim 7 further comprising blower means for moving gases from said inlet means to said outlet means.

9. The incinerator as defined in claim 4 further comprising heating means in a lower portion of said flue.

10. The incinerator as defined in claim 9 wherein said heating means comprise a gas burner.

References Cited

UNITED STATES PATENTS

| | | | |
|---|---|---|---|
| 3,061,416 | 10/1962 | Kazokas | 23—288 F |
| 3,220,794 | 11/1965 | Stiles | 423—245 |
| 3,460,523 | 8/1969 | Stiles et al. | 126—19 R |
| 3,476,508 | 11/1969 | Kerby et al. | |
| 3,503,716 | 3/1970 | Berger | 23—288 F |
| 3,544,264 | 12/1970 | Hardison | 23—288 FX |
| 3,599,427 | 8/1971 | Jones et al. | 23—288 FX |
| 3,690,840 | 9/1972 | Volker | 23—288 FX |

JOSEPH SCOVRONEK, Primary Examiner

U.S. Cl. X.R.

23—288 R; 423—245